July 31, 1934.  S. N. JOHANSEN  1,968,768
CAMERA ATTACHMENT FOR MAKING MOVABLE PHOTOGRAPHS
Filed Oct. 31, 1933  4 Sheets-Sheet 1
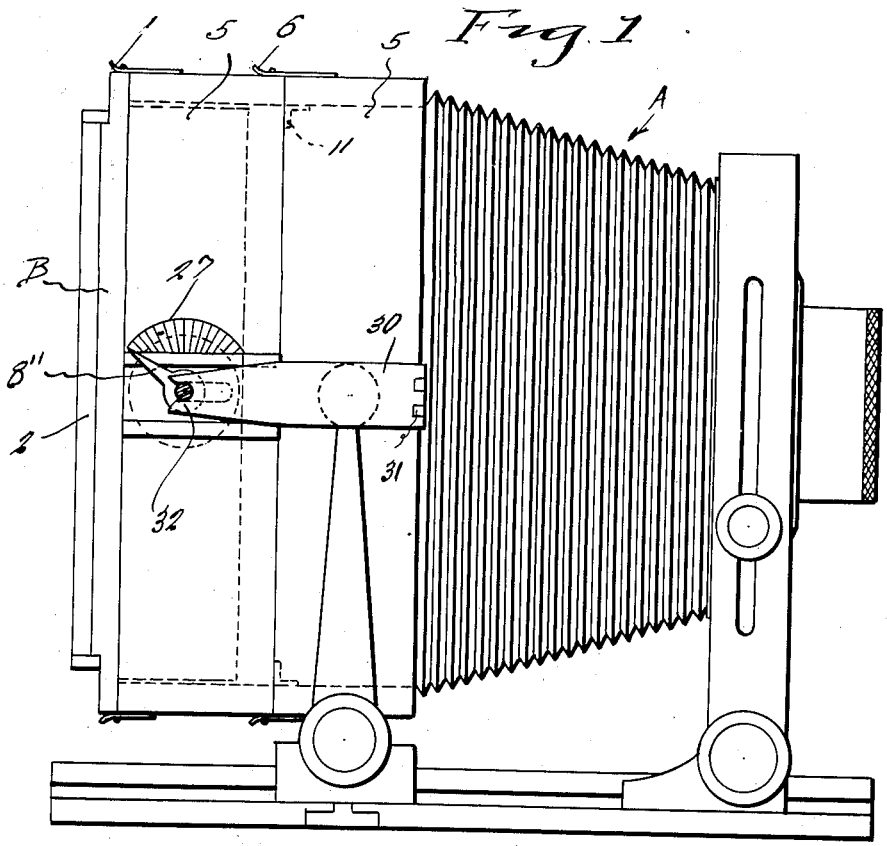
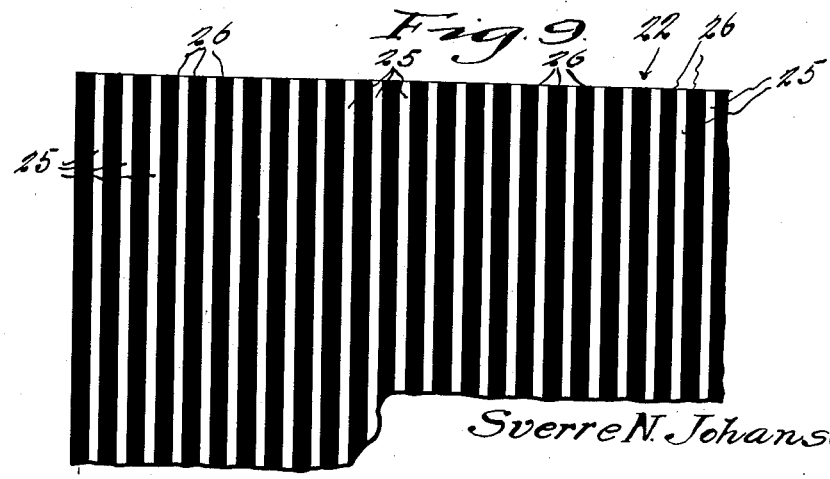
Inventor
Sverre N. Johansen
By Clarence A. O'Brien
Attorney July 31, 1934.   S. N. JOHANSEN   1,968,768
CAMERA ATTACHMENT FOR MAKING MOVABLE PHOTOGRAPHS
Filed Oct. 31, 1933   4 Sheets-Sheet 2
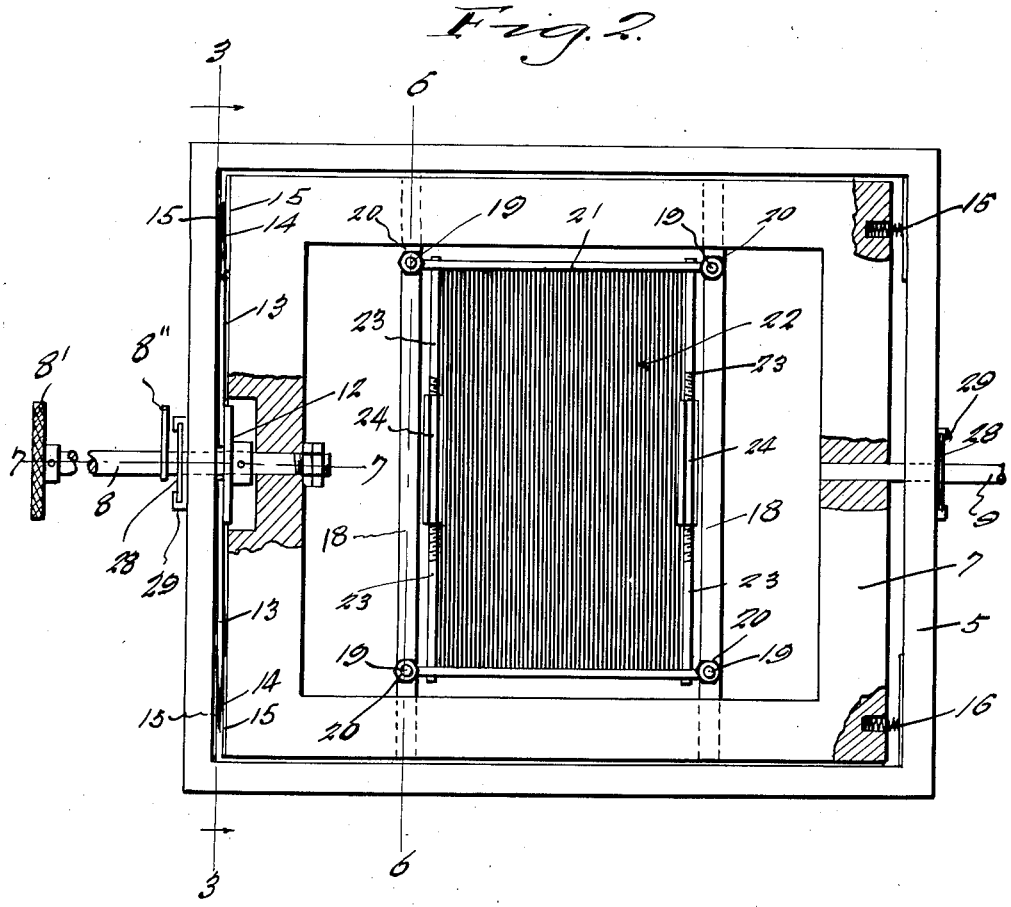
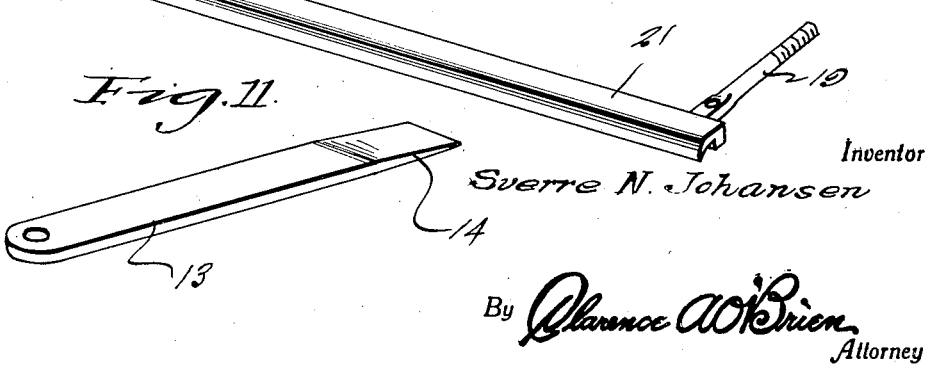
Inventor
Sverre N. Johansen
By Clarence A. O'Brien
Attorney July 31, 1934.  S. N. JOHANSEN  1,968,768
CAMERA ATTACHMENT FOR MAKING MOVABLE PHOTOGRAPHS
Filed Oct. 31, 1933  4 Sheets-Sheet 3
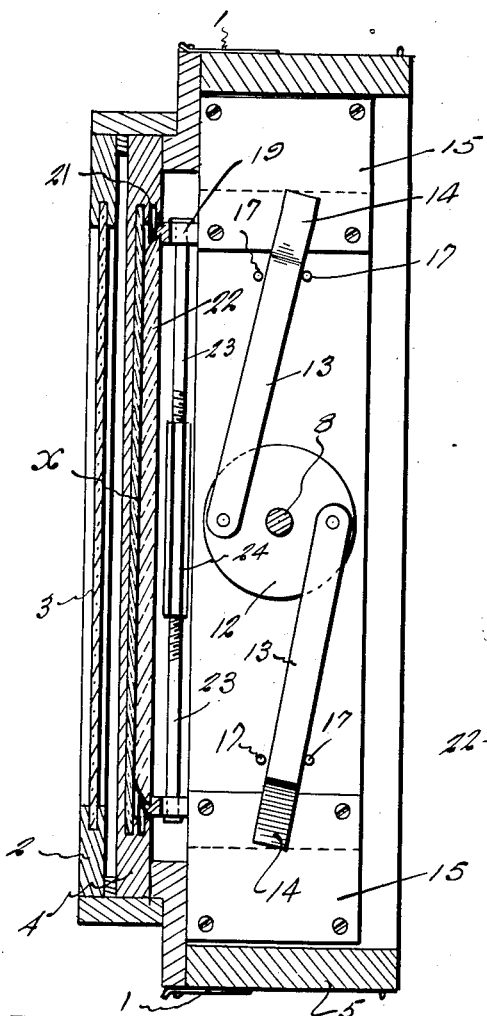
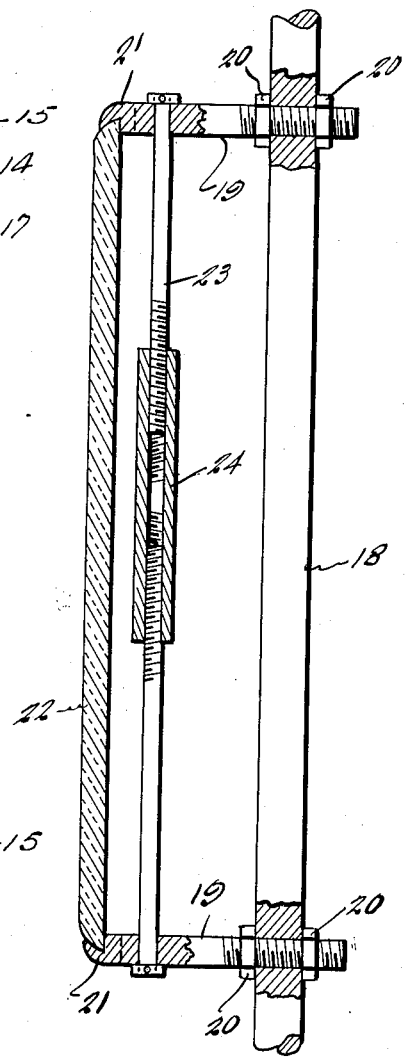
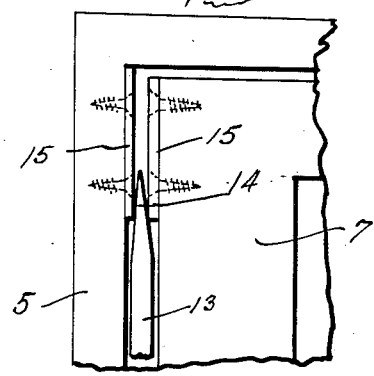
Inventor
Sverre N. Johansen
By Clarence A. O'Brien
Attorney July 31, 1934.  S. N. JOHANSEN  1,968,768
CAMERA ATTACHMENT FOR MAKING MOVABLE PHOTOGRAPHS
Filed Oct. 31, 1933    4 Sheets-Sheet 4
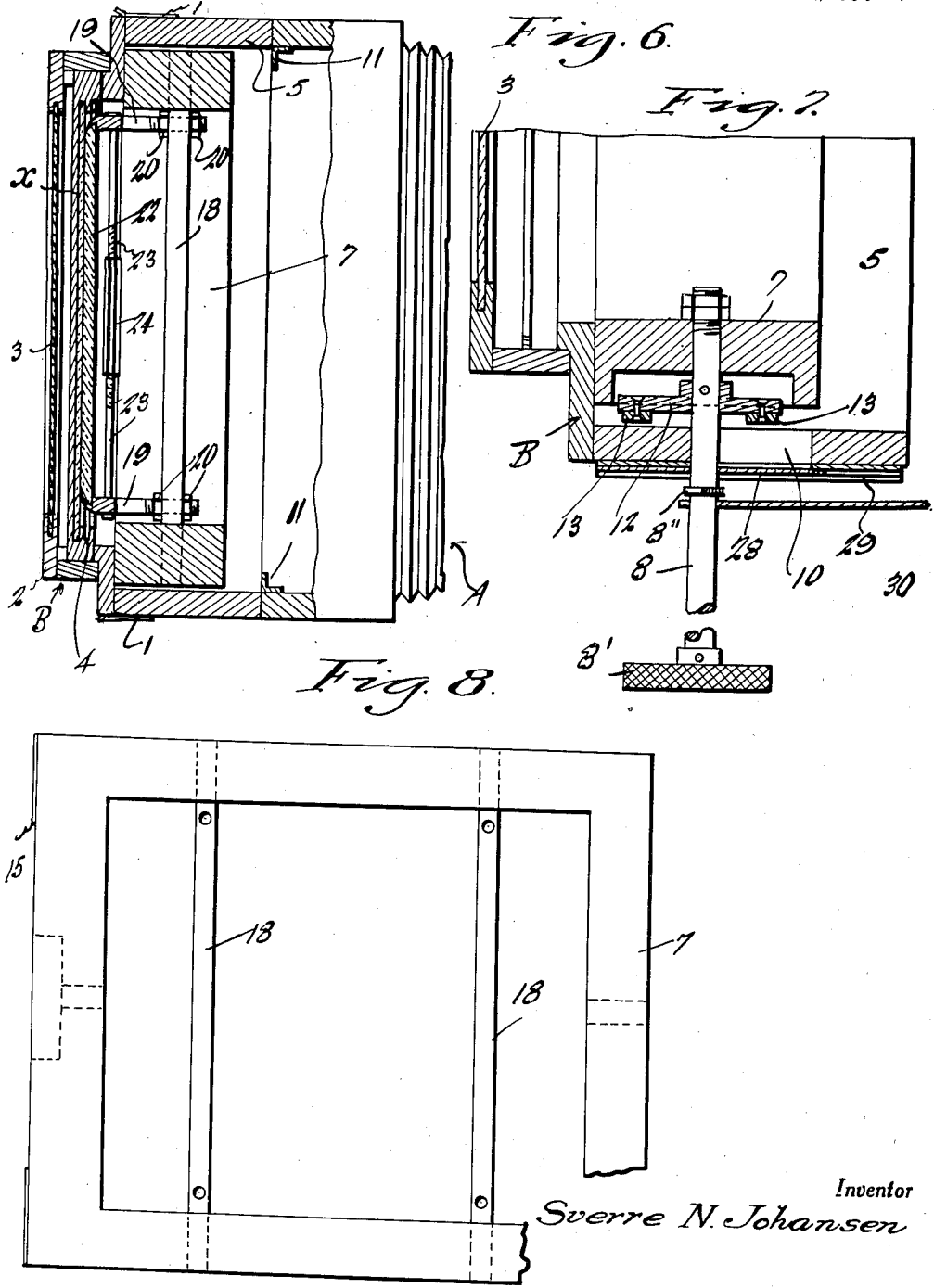
Inventor
Sverre N. Johansen
By Clarence A. O'Brien
Attorney Patented July 31, 1934

1,968,768

UNITED STATES PATENT OFFICE 1,968,768

CAMERA ATTACHMENT FOR MAKING MOVABLE PHOTOGRAPHS

Sverre N. Johansen, Seattle, Wash.

Application October 31, 1933, Serial No. 696,104

4 Claims. (Cl. 95—36)

This invention relates to a camera attachment, the general object of the invention being to provide means for holding a screen in the camera and adjusting the screen so that a number of exposures can be made upon a plate or film to produce a composite picture which, when placed in rear of a similar screen and moved, will produce a movable photograph or picture, the different exposures coming into view as the picture is moved back of the screen.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a side view of a camera, showing the invention in use thereon.

Figure 2 is a view of the attachment separated from the front part of the camera, and showing parts in section.

Figure 3 is a section on line 3—3 of Figure 2.

Figure 4 is a view partly in section of the screen holding means.

Figure 5 is a fragmentary corner view showing how a wedge member operates to move the screen supporting frame.

Figure 6 is a section on line 6—6 of Figure 2.

Figure 7 is a section on line 7—7 of Figure 2.

Figure 8 is an elevation of the screen supporting frame.

Figure 9 is a view of the screen.

Figure 10 is a perspective view of one of the screen holders.

Figure 11 is a view of one of the wedge members.

In these drawings, the camera is shown at A and may be of any suitable type and the letter B indicates the rear member of the camera which is detachably connected to the camera by the latch means 1 and this member carries the frame 2 in which the ground glass 3 is supported, this frame 2 being yieldingly held against the frame B by the usual spring which permits the plate holder 4 to be placed between the parts B and 2 in the usual manner. The latch means 1 and the member B are so formed that the member B can be placed in a vertical position or in a horizontal position to take the picture longways of the plate in a vertical position or in a horizontal position.

In carrying out my invention, I provide a main frame 5 which, when in place, forms a continuation of the rear part of the camera and is held in said rear part by the latch means 6 which are the same as the latch means 1 and the member B, with the ground plate carrying part 2, is attached to the rear part of the frame 5 by the latch means 1. An inner frame 7 is movably arranged in the main frame 5 and has the shafts 8 and 9 connected with its end or side portions and these shafts pass through slots 10 in the side parts of the frame 5 which are horizontally arranged so that by moving these shafts forwardly, the frame 7 will be moved forwardly in the frame 5 against the stops 11 in the rear part of the camera, or by moving the shafts rearwardly in the slots 10, the frame 7 will be moved rearwardly in the frame 5. The shaft 8 is rotatably supported in the frame 7 and carries a disk 12, to opposite portions of which the wedge members 13 are pivoted, the free ends of these members being of wedge shape, as shown at 14 in Figure 11. These ends are adapted to engage between the pairs of plates 15 arranged in corner portions of the frames 5 and 7, respectively, and when these wedge members are projected by turning movement of the disk and shaft 8, they will move the frame 7 toward the opposite side of the frame 5 and against the action of the springs 16, as shown in Figure 2.

Thus the inner frame 7 can be moved toward and away from the plate holder and can also be moved parallel to the plate holder.

The wedge members are guided in their movement by the pairs of pins 17, as shown more particularly in Figure 3.

A pair of bars 18 is carried by the inner frame 7 and pass through the openings formed thereby and upper and lower bolts 19 pass through holes in these bars and are held in adjusted position by the nuts 20. Each pair of bolts has attached thereto a substantially channel-shaped member 21, and these channel members are adapted to receive in their channels the beveled edges of a screen plate 22, so that the bolts 19 and the channel members 21 support this screen plate and in order to hold the screen plate in the channel part, I provide a pair of long bolts 23 which pass through holes in each pair of bolts 19 and have their inner ends threaded in a sleeve 24 which provides a turnbuckle arrangement for drawing the two bolts 19 of each pair toward each other so as to clamp the screen plate in the channel member. By adjusting the nut 20, the screen member can be adjusted rearwardly or forwardly, as desired.

This screen member 22 is shown in enlarged view in Figure 9 and as will be seen, it is formed with narrow transparent or uncoated lines 25 and opaque or coated lines 26, the lines 25 and 26 alternating, with the opaque lines wider than the transparent lines. For example, the opaque lines may be .014 of an inch wide and the transparent lines .007 of an inch.

In attaching the invention to a camera, such as that shown in Figure 1, the rear member B is removed from the rear of the camera and the attachment has its frame 5 attached to the rear part of the camera and the member B attached to the rear part of the frame 5, as shown in Figure 1. The shafts 8 and 9 are then moved forwardly to move the inner frame 7 forwardly and then the plate holder 4 is put in place, as shown in Figure 3. Then the shafts 8 and 9 are moved rearwardly so as to place the screen member 22 against the photographic plate, shown at X, in Figure 3. The springs 16 will hold the frame 7 in position, at one end of its limit of movement. The shutter of the camera is then operated to make the first exposure. The shaft 8 is then turned by means of its handle 8' the proper distance, indicated by the finger 8" on the shaft on the scale 27 on the frame 5, to cause the opaque lines 26 to cover those portions of the photographic plate which has just been exposed. For example, if the spacing of the opaque and transparent lines is as given above, it follows that after each exposure, the screen is moved sidewise .007 of an inch. Thus the opaque lines on the screen will cover the previous exposure and at the same time it will be set for the next exposure. Then the second exposure is made and then the shaft 8 is again turned .007 of an inch so that the opaque lines will cover the two exposures and uncover the remaining portion of the photographic plate. Then the third exposure is made. Then the frame 7 is moved forwardly, the slide inserted in the plate holder and the holder removed.

When the plate is developed, it will show three distinct exposures and when the plate is printed, the positive will produce a photographic picture which, when put against a white background, lined in the same manner as the screen member, and moved slightly sideways, a movable photograph or picture will result which will show the three different poses.

In order to prevent rays of light passing through the slots 10, I provide a slide 28 for each slot which is formed with a hole for the passage of a shaft and its edges operate in the guideways 29. I also provide hinged plates 30 which are hinged to the rear part of the camera, as shown at 31, and have notches 32 in their rear ends engaging the shafts 8 and 9 to hold the parts in their rearmost position, as shown in Figures 1 and 7. By swinging these plates 30 outwardly and forwardly, the shafts 8 and 9 and the frame 7 can be moved forwardly.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In a camera, a screen having opaque and transparent lines thereon alternately arranged, means for adjusting the screen toward and away from the film or plate holder of the camera, and means for moving the screen parallel to the holder, step by step.

2. In a camera, a frame detachably connected to the rear part thereof, means for attaching the holder part of the camera to the rear of the frame, a second frame supported in the first frame for bodily movement rearwardly and forwardly and for sidewise movement, a screen plate having alternately arranged opaque and transparent lines thereon, means for supporting the screen plate from the second frame, means for moving the second frame forwardly and rearwardly, and means for adjusting the second frame sidewise.

3. In a camera, a frame adapted to be connected to the rear part thereof, means for detachably connecting the holder of the camera to the rear part of the frame, a second frame movably supported in the first frame, a pair of shafts connected to opposite portions of the second frame and the first frame having slots through which the shafts pass, said slots extending horizontally whereby movement of the shafts therein will adjust the second frame forwardly and rearwardly, means operated from one of the shafts for moving the second frame sidewise, springs for resisting said movement, a shutter for closing each slot and movable with a shaft, and means for clamping a screen plate to a part of the second frame, and latch means engaging the shafts for holding the second frame in its rearward position.

4. An attachment for a camera comprising a frame, means for attaching the frame to the rear part of a camera, means for attaching the plate or film holder of the camera to the rear of the frame, a second frame movable in the first frame, said first frame having horizontal slots therein, a pair of oppositely arranged shafts connected with the second frame and passing through said slots, shutter means connected with the shafts for closing the slots, one of the shafts being rotatably supported, a disk on the shaft and rotating therewith, a pair of wedge members having their inner ends pivotally connected to opposite parts of the disk, with the free ends of said wedge members being of wedge shape and engaging portions of the first mentioned frame and the second frame to move said second frame sidewise parallel to the plate or film in the holder, spring means for resisting said movement, a pointer on the exterior part of one of the shafts and rotating therewith, and a scale on the first mentioned frame cooperating with the pointer to indicate the amount of sidewise movement of the second frame, a screen plate, and adjustable means for detachably connecting the screen plate to the second frame.

SVERRE N. JOHANSEN.